United States Patent
Cheng et al.

(10) Patent No.: US 9,331,991 B2
(45) Date of Patent: *May 3, 2016

(54) AUTHENTICATING A CLIENT USING LINKED AUTHENTICATION CREDENTIALS

(75) Inventors: Yan Cheng, Great Falls, VA (US); Zhihong Zhang, Great Falls, VA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 969 days.

This patent is subject to a terminal disclaimer.

(21) Appl. No.: 12/575,121

(22) Filed: Oct. 7, 2009

(65) Prior Publication Data

US 2010/0024013 A1   Jan. 28, 2010

Related U.S. Application Data

(63) Continuation of application No. 11/023,649, filed on Dec. 29, 2004, now Pat. No. 7,603,700.

(60) Provisional application No. 60/605,574, filed on Aug. 31, 2004.

(51) Int. Cl.
*H04L 29/06* (2006.01)
*G06F 21/41* (2013.01)
*H04L 9/32* (2006.01)

(52) U.S. Cl.
CPC ............... *H04L 63/08* (2013.01); *G06F 21/41* (2013.01); *H04L 9/3271* (2013.01); *H04L 63/18* (2013.01); *H04L 63/0428* (2013.01)

(58) Field of Classification Search
None
See application file for complete search history.

(56) References Cited

U.S. PATENT DOCUMENTS

| | | |
|---|---|---|
| 5,999,711 A | 12/1999 | Misra et al. |
| 6,044,471 A | 3/2000 | Colvin |
| 6,367,009 B1 | 4/2002 | Davis et al. |
| 6,377,691 B1 | 4/2002 | Swift et al. |
| 6,643,774 B1 | 11/2003 | McGarvey |
| 6,651,168 B1 | 11/2003 | Kao et al. |
| 6,785,825 B2 | 8/2004 | Colvin |
| 7,100,044 B2 | 8/2006 | Watanabe et al. |
| 7,281,128 B2 | 10/2007 | Mikel et al. |
| 2002/0069361 A1* | 6/2002 | Watanabe et al. ............. 713/185 |
| 2002/0169988 A1 | 11/2002 | Vandergeest et al. |
| 2003/0188193 A1 | 10/2003 | Venkataramappa |
| 2003/0212806 A1 | 11/2003 | Mowers et al. |
| 2003/0226036 A1 | 12/2003 | Bivens et al. |
| 2004/0243832 A1 | 12/2004 | Wilf et al. |
| 2005/0210252 A1 | 9/2005 | Freeman et al. |

FOREIGN PATENT DOCUMENTS

EP    1351467 A2    10/2003

OTHER PUBLICATIONS

Kohl, J., and Neumann, C., "The Kerberos Network Authentication Service (V5)," The Internet Engineering Task Force, Network Working Group, Sep. 1993, 105 pgs.

(Continued)

*Primary Examiner* — Benjamin Lanier
(74) *Attorney, Agent, or Firm* — Banner & Witcoff, Ltd.

(57) ABSTRACT

Techniques are provided for improving security in a single-sign-on context by providing, to a user's client system, two linked authentication credentials in separate logical communication sessions and requiring that both credentials be presented to a host system. Only after presentation of both credentials is the user authenticated and permitted to access applications on the host system.

20 Claims, 12 Drawing Sheets

(56) References Cited

OTHER PUBLICATIONS

Stallings, William, "Cryptography and Network Security," 1999, Prentice Hall, Second Edition, pp. 444-445.

International Search Report, Application Serial No. PCT/US05/30539, dated May 7, 2007, 10 pages.

First Examination Report of corresponding Indian National Phase Application No. 1642/DELNP/2007, mailed Oct. 28, 2014.

* cited by examiner

FIG. 5A

| TICKET IDENTIFIER | SESSION KEY | PARENT TICKET IDENTIFIER | VALIDITY PERIOD | FUNCTIONS ALLOWED | USER NAME AND AUTHORIZATION DATA | USABLE FROM IP ADDRESS | USABLE? |
|---|---|---|---|---|---|---|---|
| 511A | 512A | 513A | 514A | 515A | 516A | 517A | 518A |

| 511B | 513B | 514B | 515B |
|---|---|---|---|
| 123456789 | | 8/15/05 16:15 | |
| 345678912 | 123456789 | 8/15/05 16:15 | Registration ← 522 |
| 456789944 | 123456789 | 08/15/05 16:15 | Sign-on ← 523 |
| 675757575 | 456789944 | 8/15/05 19:21 | Secure e-mail ← 524 |

521 ↑

500B

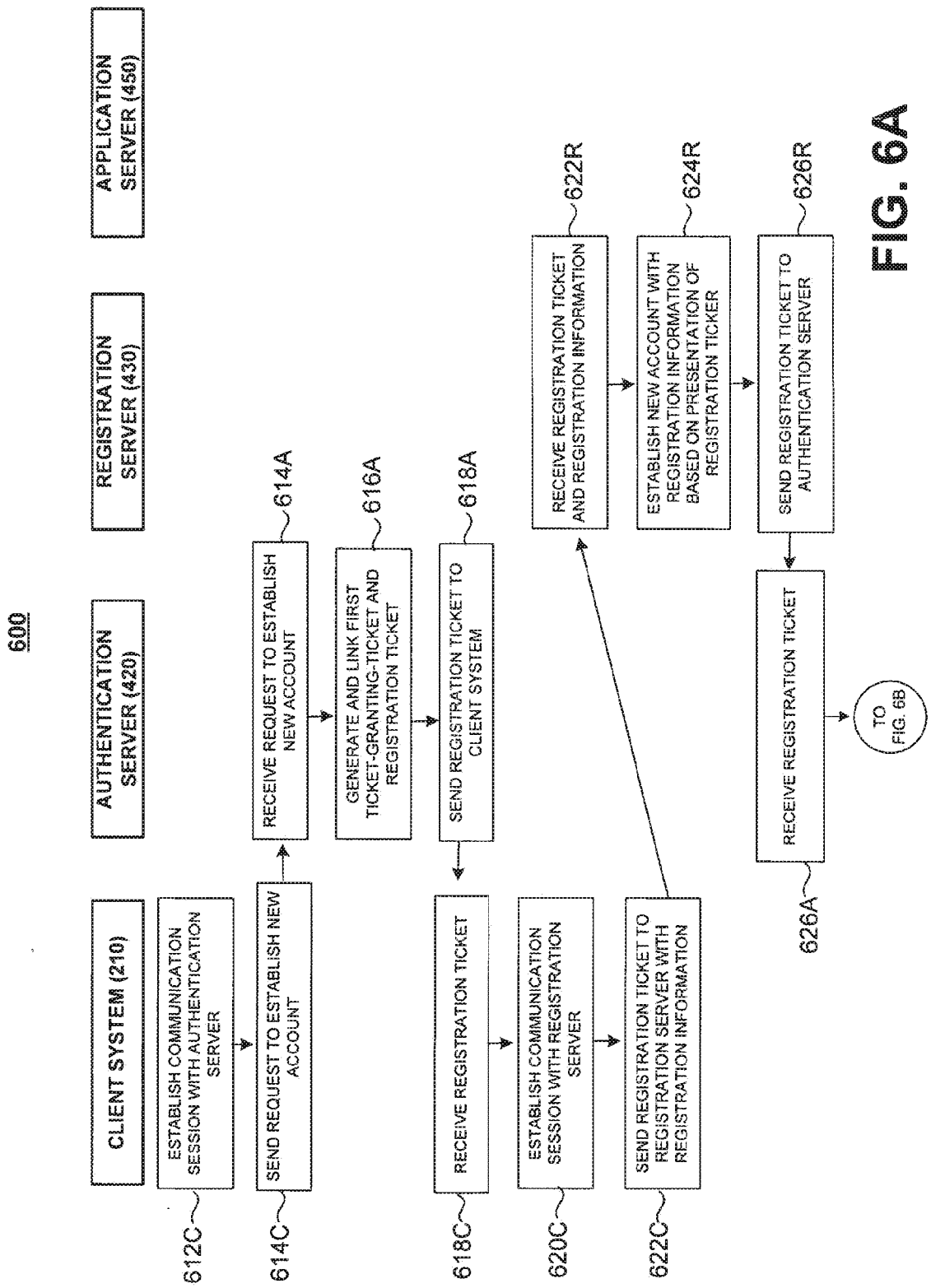

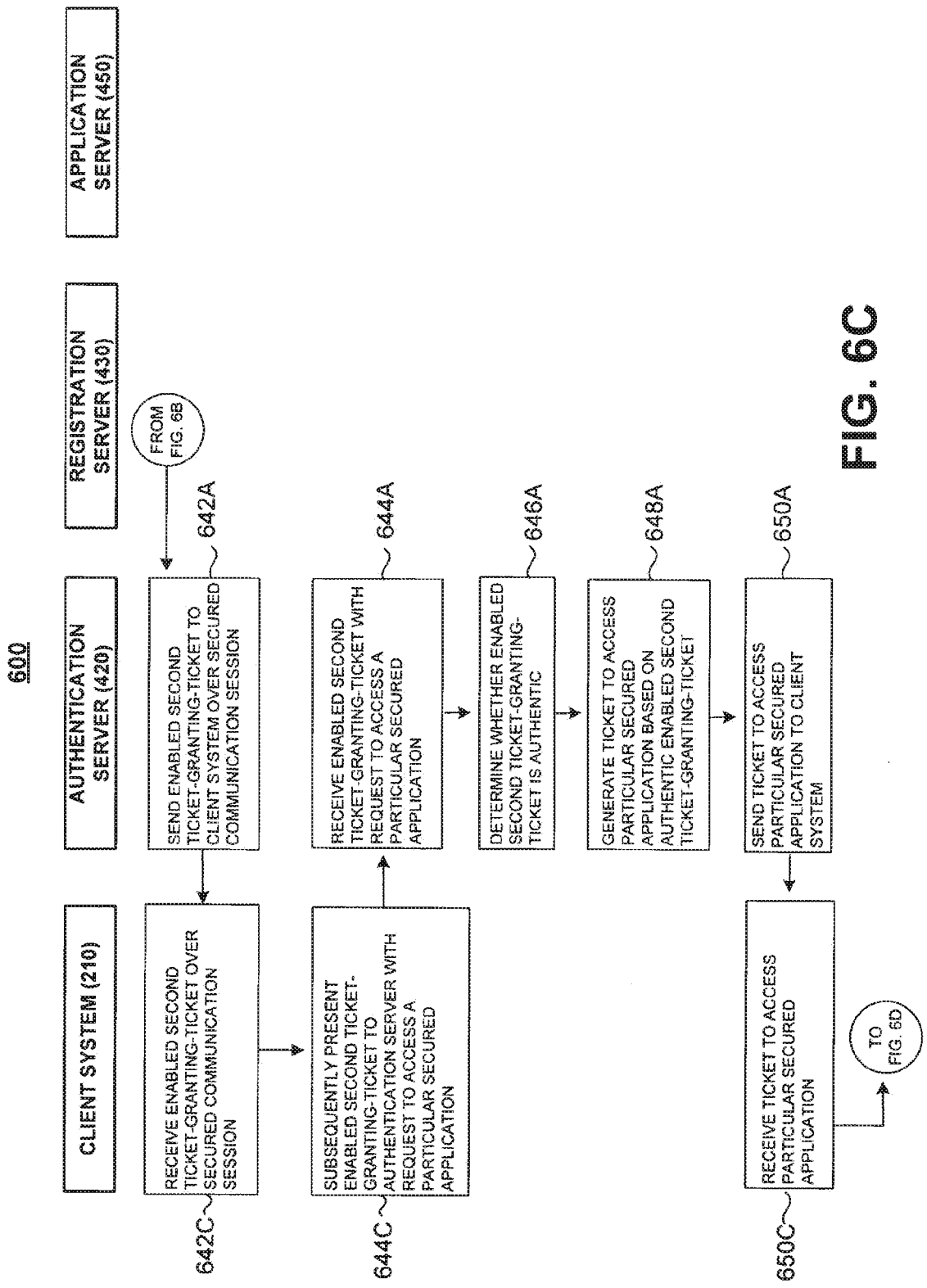

AUTHENTICATING A CLIENT USING LINKED AUTHENTICATION CREDENTIALS

CROSS REFERENCE TO RELATED APPLICATIONS

This application is a continuation of U.S. application Ser. No. 11/023,649, filed Dec. 29, 2004, and titled AUTHENTICATING A CLIENT USING LINKED AUTHENTICATION CREDENTIALS, and claims priority to U.S. Provisional Application No. 60/605,574, filed Aug. 31, 2004, and titled AUTHENTICATION SERVICES DURING USER REGISTRATION, both of which are incorporated by reference in their entireties.

TECHNICAL FIELD

This description relates to communicating between two computer systems and authenticating a device or an identity associated with one of the computer systems to the other of the computer systems.

BACKGROUND

When two systems communicate, a device or an identity using a device in one of the computer systems typically is identified to the other computer system. For example, a device or an associated identity in a client system may be identified to a host system. The identification of a device or an identity may permit a host system to make specific features or information available or unavailable to the device or the identity using the device.

In some computer systems, the identity of a user or a device must the authenticated before the user or the device is permitted to access functions provided by the computer system. User authentication may be based on the presentation of a user name and a password, the combination of which is validated by the computer system. Also, a user or a device may be authenticated using a cryptographic process in which a user identity or a device is proven valid through the use of cryptographic authentication credentials.

SUMMARY

In one general aspect, authenticating a client includes providing, in a first communication session, a first authentication credential to a client device and providing, in a second communication session that is different from the first communication session, a second authentication credential. The first authentication credential and the second authentication credential are received from the client device in a third communication session that is different from the second communication session. A determination is made as to whether the first authentication credential and the second authentication credential are linked, and the second authentication credential is enabled to be used as a mechanism in authenticating the client based on a determination that the first authentication credential and the second authentication credential are linked.

Implementations may include one or more of the following feature. For example, enabling the second authentication credential for use may include modifying indicia associated with the second authentication credential to enable the second authentication credential to operate as a mechanism for authenticating the client based on a determination that the first authentication credential and the second authentication credential are linked. The client may be a user identity, a user account or a client device. The second authentication credential provided over the second communication session may not be enabled as a mechanism to be used in authenticating the client. Instead, the second authentication credential that is enabled for use in authentication of the client may be provided over the third communication session.

Each or both of the first and third communication sessions may be a secure communication session. The second communication session may differ in security from the first and third communication sessions. The second authentication credential may be enabled for use in authentication of the client for a predetermined amount of time or for use in only a single communication session.

The first authentication credential may include a first ticket-granting ticket that may be used only in a single communication session and may include an identifier. The second authentication credential may include a second ticket-granting ticket that may be used only in a single communication session. Determining whether the first authentication credential and the second authentication credential are linked may include determining whether the second ticket-granting ticket includes an indicator of the identifier of the first tick, ticket-granting ticket. Enabling the second authentication credential for use may include enabling the second ticket-granting ticket for use in authentication of the client only when the second ticket-granting ticket includes an indicator of the identifier of the first ticket-granting ticket.

A registration credential that is linked to the first authentication credential may be provided over the first communication session, and the second authentication credential that is enabled for use in authentication of the client may be provided over the third communication session. A client may be enabled to access a service based on presentation of the second authentication credential.

Enabling the client to access a service based on the second authentication credential may include providing, based on the second authentication credential, a service authentication credential to the client device for use in accessing a service.

In another general aspect, authenticating a client includes receiving an authentication credential from a client; determining whether the authentication credential is valid; and, only in response to a determination that the authentication credential is valid, modifying the authentication credential into an activated authentication credential able to be used for authentication of the client.

Implementations may include one or more of the features noted above and one or more of the following features. For example, the authentication credential may include a ticket-granting ticket. The activated authentication credential may be able to be used for authentication of the client for a predetermined amount of time or for authentication of the client in a only single communication session.

Implementations of the techniques discussed above may include a method or process, a system or apparatus, or computer software on a computer-accessible medium. The details of one or more of the implementations are set forth in the accompanying drawings and description below. Other features will be apparent from the description and drawings, and from the claims.

DESCRIPTION OF DRAWINGS

FIG. 5A is a block diagram of an example data structure used in authenticating a client.

FIG. 5B is a diagram showing example authentication credentials using a portion of the data structure of FIG. 5A.

FIGS. 6A-6D are diagrams showing a process involving a client system and an authentication system having an authentication server, a registration server and an application server to provide to a client an authentication credential and provide to the client access to a secured application based on the presentation of the authentication credential.

Like reference symbols in the various drawings indicate like elements.

DETAILED DESCRIPTION

To fully understand the techniques presented in this description, the challenges and issues are discussed related to securely enabling a user of a client system to sign-on only once to a host system and access multiple applications provided by the host system, where each application authenticates a user before enabling the user to access the application. Often, a user may prefer to enter authentication information only once during a communication session with the host system. The term "single-sign-on" may be used to refer to the ability of a user to access multiple secure applications during a communication session with entering authentication information only once. In some single-sign-on processes, a user may be authenticated once and, based on that authentication, may be provided with an authentication credential that is used to gain access by the user to each application. Often, the authentication credential (or another type of credential generated based on the authentication credential) is provided to each application transparently such that the user need not necessarily be aware that a credential is provided to an application. A challenge or issue arises in how to securely provide the authentication credential to a user to diminish, or eliminate, the likelihood that an authentication credential will be misappropriated and inadvertently or maliciously used to gain access to an application on the host system.

Accordingly, techniques are provided for improving security in a single-sign-on context by providing, to the user's client system, two linked authentication credentials in separate logical communication sessions and requiring that both credentials be presented to the host system. Only after presentation of both credentials is the user authenticated and permitted to access applications on the host system.

Figure 1:
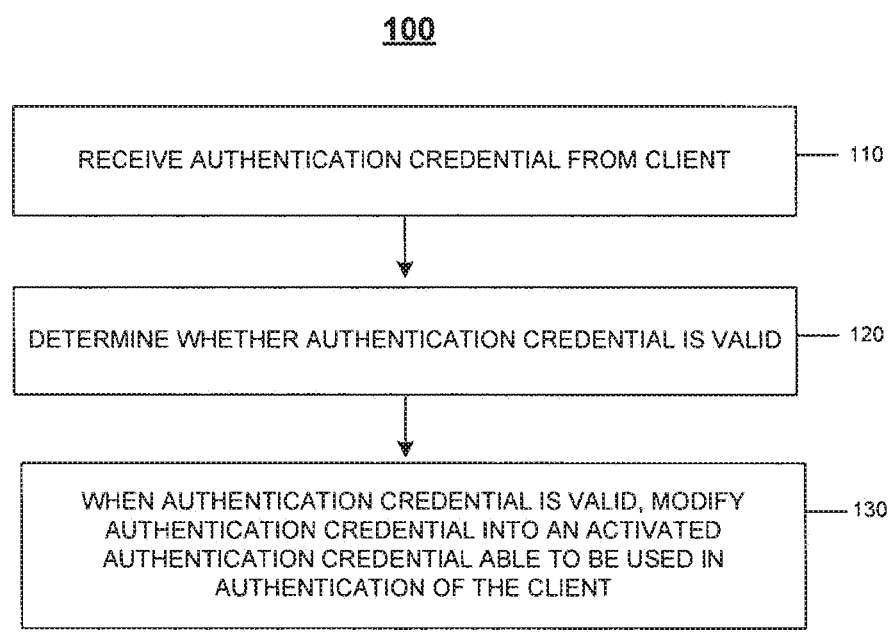
FIG. 1 is a flow chart of a process for authenticating a client.

FIG. 1 shows a process 100 for authenticating a client. Examples of a client include a client computer system, a device, or a user identity that seeks to access a host system or a service provided by a host system. The process 100 may be performed by a host system, or more particularly, a processor or processors on the host system, that seeks to authenticate a client.

The process 100 begins when a processor receives an authentication credential from a client (step 110). The authentication credential is used to establish or prove the identity of a device or a person using a device and to enable establishment of a communications session involving the identity. For example, an authentication credential provides information that associates a particular identity with a statement, an action or an event to prove the particular identity is participating in the communication session. The authentication credential may be based on something the identity knows (such as a password, an encryption key or another type of secret shared between the communicating identities), something the identity has (such as a smartcard or another type of token), or something the identity is (such as a measurement of a physical feature that is unique to an individual, such as a fingerprint or a retinal pattern). In a more particular example, the authentication credential may be, or may include, a time-limited cryptographic message (called a ticket-granting ticket) used in a Kerberos or other authentication process to authenticate an identity. Identity authentication may include the use of the secure socket layer (SSL) protocol or the transport layer security (TLS) protocol. SSL uses a private encryption key to encrypt data that is transferred over the SSL connection. TLS is extension of SSL that allows negotiation of an encryption algorithm and cryptographic keys before the authentication of an identity.

The processor determines whether the authentication credential is valid (step 120). This may be accomplished, for example, by looking up an identifier associated with the authentication credential on a table, list or other type of data structure that stores authentication credential identifiers for valid authentication credentials. In another example, a determination may be made as to whether the received authentication credential is valid based on an association of the authentication credential with another authentication credential. For example, an authentication credential may be presented with another authentication credential that is known to be valid and, based on the presentation of both authentication credentials, the authentication credential may be determine at to be valid.

The processor may engage in a challenge and response exchange with the client to determine whether the authentication credential is valid. In general, a challenge and response exchange involves having a challenger send to a responder a data item. The responder modifies the data item in a way expected by the challenger and returns the modified data item to the challenger. The challenger verifies that the data item was modified in the expected manner, and, if so, authenticates the responder. More particularly, the challenger may be a host system or an authentication system, and the responder may be a client system. The host or authentication system sends to the client system a data item, such as a non-repeatable number (which may be called a nonce). The client system encrypts the data item and returns the encrypted data item to the challenger. The challenger authenticates the responder by decrypting the encrypted data item and verifying that the encrypted data corresponds to the data item.

In one implementation, the challenger and the responder may use a shared key that is known only by the challenger and the responder, where the operation of cryptographically modifying the data item uses a symmetric cryptographic algorithm. In another implementation, the shared key be in the form of a public/private key pair, where the private key is known only to the responder and the public key is known by the challenger (and, perhaps, others). The challenge and response exchange is able to confirm the identity of the recipient because the recipient is presumed to be the only entity in possession of the necessary key to produce a correct response.

In some implementations, in lieu of a challenge-response exchange, the authentication credential may be encrypted by the client and provided to the processor. The authentication credential may be determined to be valid when the processor is able to decrypt the authentication credential.

The processor modifies the received authentication credential to become an activated authentication credential that may be used in authentication of a client only in response to a determination that the authentication credential is valid (step 130). An activated authentication credential also may be referred to as an enabled authentication credential, an active authentication credential, a valid authentication credential, or a usable authentication credential. In one example, a status indicator of the authentication credential may be set to reflect an active or valid status. In another example, an identifier of the authentication credential may be added to a list of activated authentication credentials.

Figure 2:
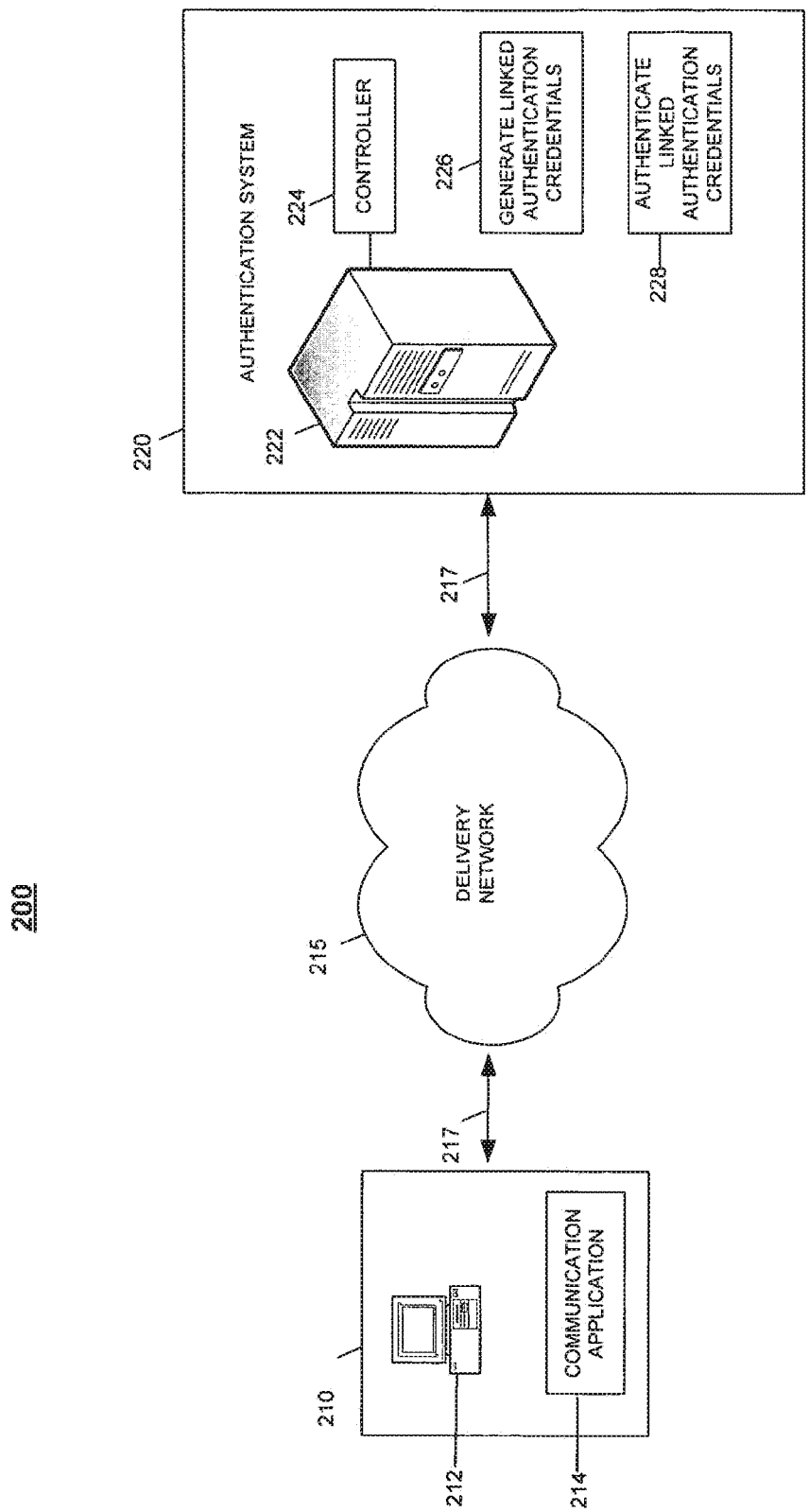
FIGS. 2 and 4 are block diagrams of communications systems capable of providing an authentication credential to a client where the authentication credential is enabled for use based on presentation of multiple linked authentication credentials by the client.

Referring to FIG. 2, a communications system 200 is capable of providing an authentication credential for use in authenticating a client where the authentication credential is enabled based on presentation of multiple linked authentication credentials. More particularly, the communications system 200 is capable of delivering and exchanging messages between a client system 210 and an authentication system 220 through a delivery network 215.

The client system 210 may include a general-purpose computer (e.g., a personal computer, a desktop computer, or a laptop computer) capable of responding to and executing instructions in a defined manner. As shown, the client system includes a desktop computer 212. Other examples of the client system 210 include a special-purpose computer, a workstation, a server, a device, a component, other physical or virtual equipment or some combination thereof capable of responding to and executing instructions. The client system 210 also may be a personal digital assistant (PDA), a communications device, such as a mobile telephone, or a mobile device that is a combination of a PDA and communications device.

The client system 210 also includes a communication application 214 and is configured to use the communication application 214 to establish a communication session with the authentication system 220 over the delivery network 215. The communication application 212 may be, for example, a browser or another type of communication application that is capable of accessing the authentication system 220. In another example, the communication application 212 may be a client-side application that is specifically configured to establish a communication session with the authentication system 220 and exchange messages with the authentication system 220 for the purpose of authenticating a client.

The delivery network 215 provides a direct or indirect communication link between the client system 210 and the authentication system 220, irrespective of physical separation. Examples of a delivery network 215 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSI ("Asymmetric Digital Subscriber Loop), HDSL ("High bit-rate Digital Subscriber Line"), and VDSL ("Very high bit-rate Digital Subscriber Line)), radio, television, cable, satellite, and/or any other delivery mechanism for carrying data.

The delivery network 215 may include communication pathways 217 that enable communications through the one or more delivery networks 215 described above. Each of the communication pathways 217 may include, for example, a wired, wireless, virtual, cable or satellite communications pathway.

The authentication system 220 is configured to provide a usable authentication credential to the client system 210 where the authentication credential is enabled based on presentation of multiple linked authentication credentials by the client system 210. More particularly, the authentication system 220 includes an authentication device 222 and an authentication controller 224. In one example, an Internet access provider (or Internet service provider) may operate the authentication system 220. The authentication device 222 and the authentication controller 224 each typically include one or more hardware components and/or software components. An example of the authentication device 222 is a general-purpose computer capable of responding to and executing instructions in a defined manner. Other examples include a special-purpose computer, a workstation, a server, a device, a component, or other physical or virtual equipment or some combination thereof capable of responding to and executing instructions.

An example of the authentication controller 224 is a software application loaded on the authentication device 222 for commanding and directing communications enabled by the authentication device 222. Other examples include a program, a piece of code, an instruction, a device, a computer, a computer system, or a combination thereof, for independently or collectively instructing the authentication device 222 to interact and operate as described. The authentication controller 224 may be embodied permanently or temporarily in any type of machine, component, physical or virtual equipment, storage medium, or propagated signal capable of providing instructions to the authentication device 222.

In general, the authentication system 220 is configured to authenticate a client using linked authentication credentials. The client authenticated by the authentication system 220 may be a user identity, a user account, a screen name of a user account that is associated with multiple screen names, a client system, or a client device. The authentication system 220 is configured to generate, using code segments 226, two authentication credentials that are logically linked. In one example of how two authentication credentials may be linked, one of the authentication credentials may include an identifier that is associated with the other authentication credential. In another example, the authentication system 220 may include an indicia of the logical linkage of the two authentication credentials. This may include, for example, a database table, a list or another type of data structure that associates identifiers of each of the linked authentication credentials.

The authentication system 220 is configured to provide separately each of the two linked authentication credentials to the client system 210. For example, the authentication system 220 may provide each of the linked authentication credentials to the client system 210 through separate physical connections to the client system 210. In another example, the authentication system 220 may provide each of the linked authentication credentials to the client system 210 through separate logical communication sessions that use the same physical connection.

The authentication system 220 also is configured to receive from the client system 210 the two linked authentication credentials. For example, the authentication system 220 may receive the two linked authentication credentials over a physical connection or a logical communication session with the client system 210. The linked authentication credentials may be received from a secured logical communication session or a secured physical connection.

The authentication system 220 is configured to use code segments 228 to authenticate the received authentication credentials. More particularly, the authentication system 220 enables one of the authentication credentials to be used as a mechanism to authenticate the client system 210 based on a determination that the first authentication credential and the second authentication credential are linked. The authentication system 220 is configured to provide the enabled authentication credential to the client system 210 for later use in authenticating the client system 210.

In sum, the authentication system 220 provides to the client system 210 linked authentication credentials through separate physical communication connections and/or logical communication sessions and only permits an authentication credential to be used as a mechanism for authenticating a client when or after both of the linked authentication credentials are presented. This may help to diminish, if not eliminate, the likelihood that, an authentication credential will be misappropriated and inadvertently or maliciously used to authenticate the client system 210. For example, a single authentication credential provided by the authentication system 220 to the client system 210 may be more easily discoverable (e.g., by reading, sniffing or otherwise monitoring network traffic over the communication pathways 217 between the authentication system 220 and the client system 210) than two linked authentication credentials provided over separate connections and/or separate logical communication sessions.

Figure 3A:
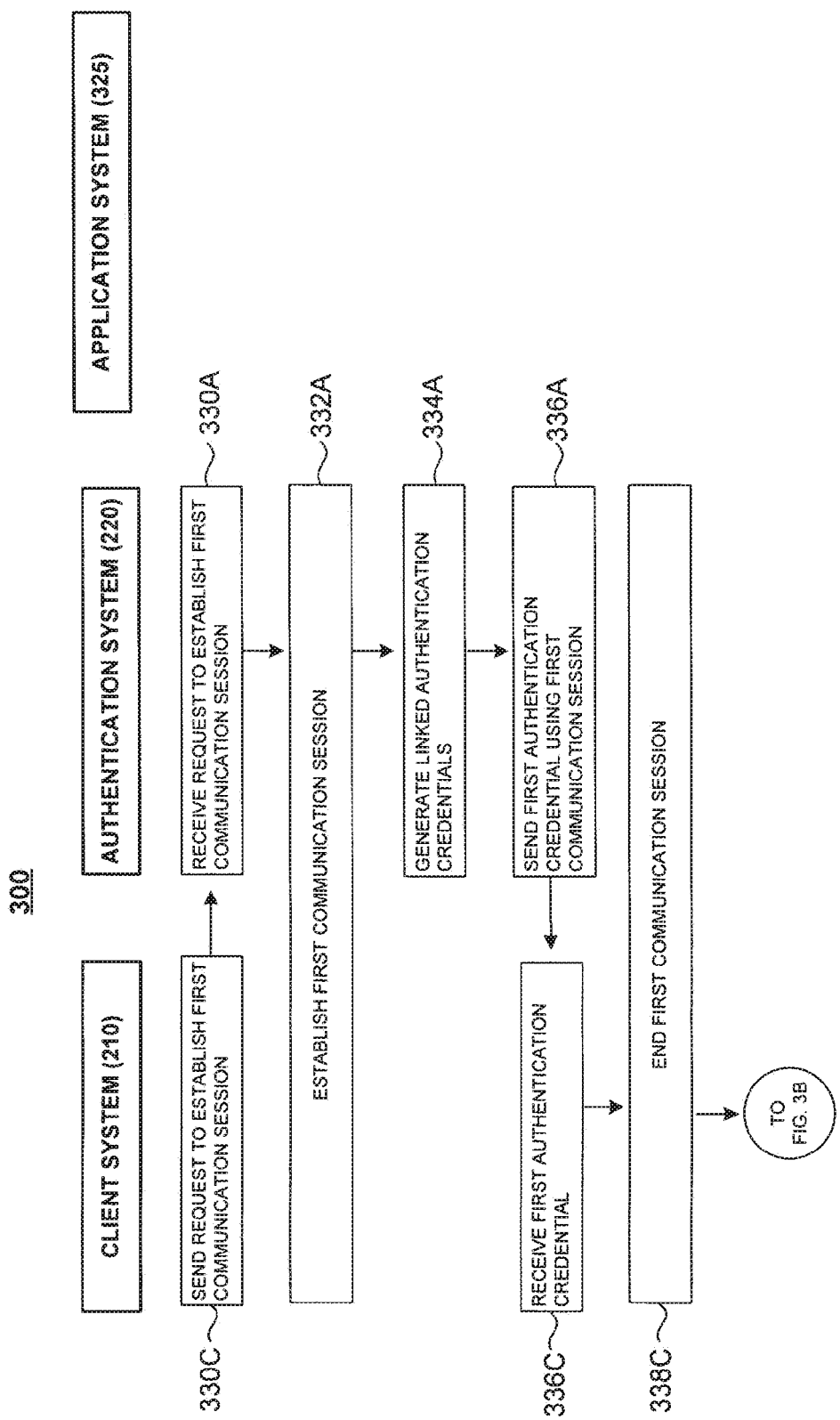
FIGS. 3A-3C are diagrams depicting a process involving the use of a client system and a host system to provide an authentication credential to the client system.
Figure 3B:
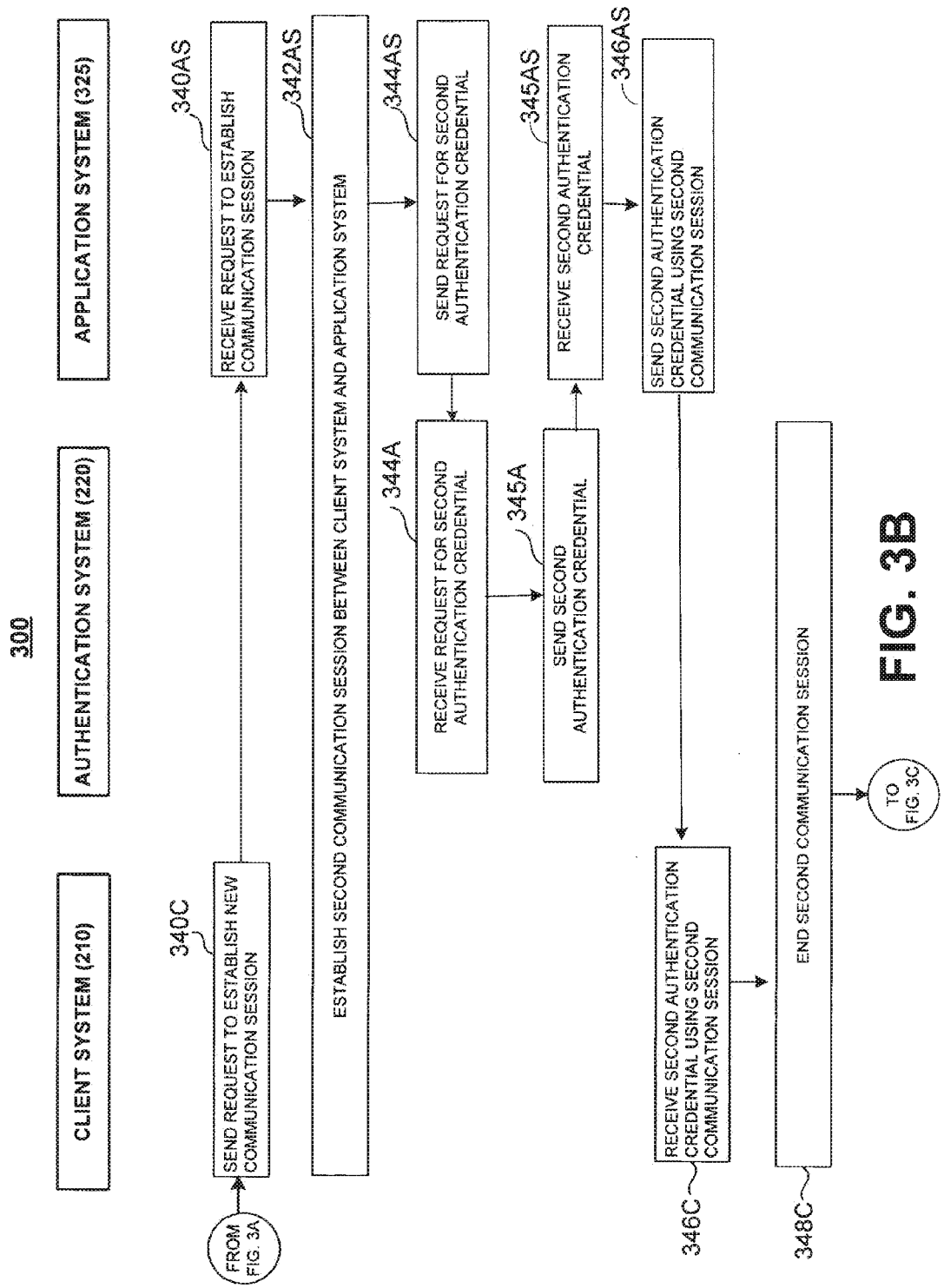
Figure 3C:
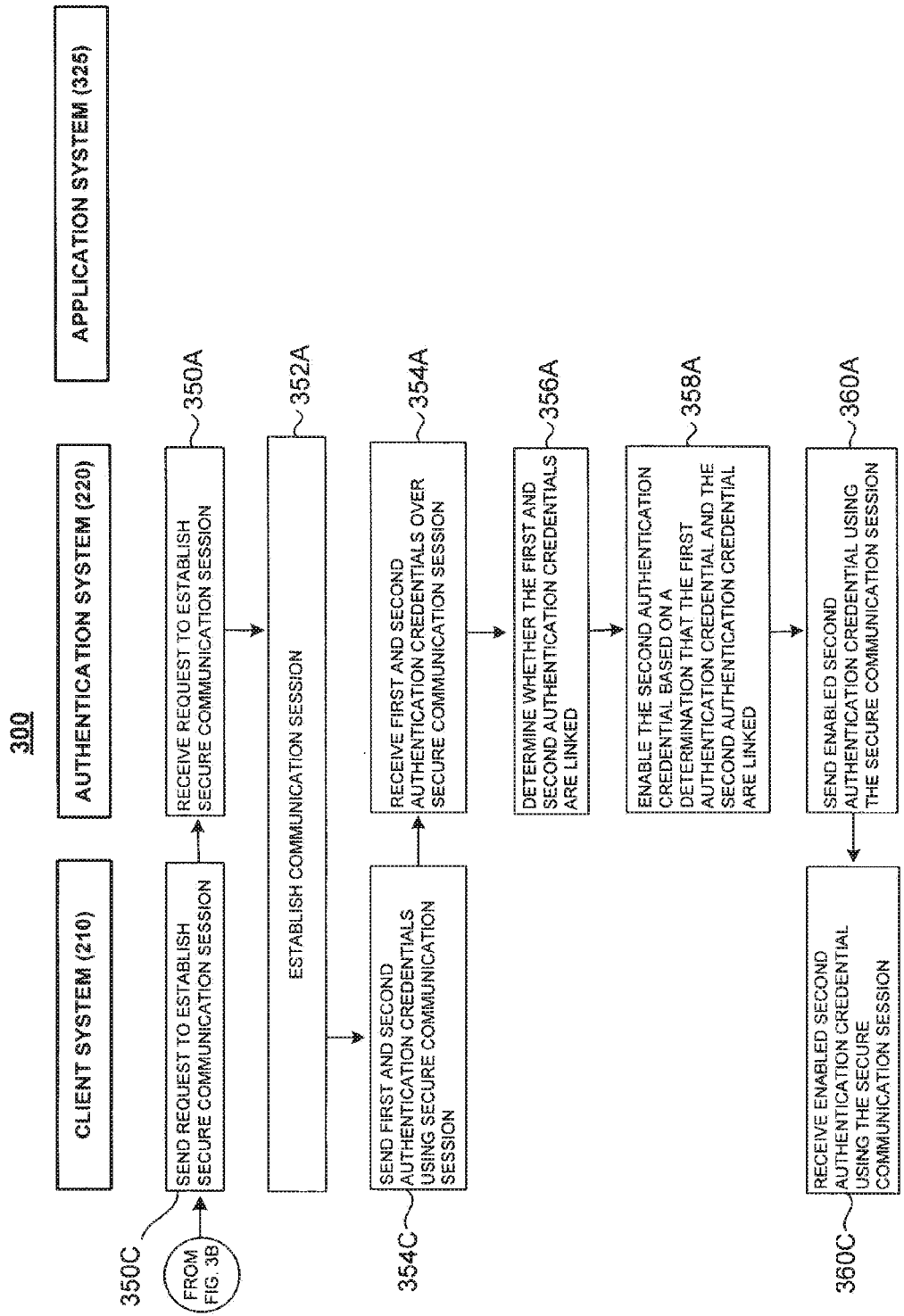

FIGS. 3A-3C illustrate a process 300 involving a client system 210 an authentication system 220, and an application system 325, with the process being used to provide an authentication credential to a client. The authentication credential may be used to authenticate an identity using the client system 210, a component of the client system 210 or the client system 210 itself. For convenience, the process 300 shown in FIGS. 3A-3C references particular componentry described with respect to FIG. 2. However, similar methodologies may be applied in other implementations where different componentry is used to define the structure of the system, or where the functionality is distributed differently among the components shown in FIG. 2.

The application system 325 may be, for example, a registration server that may be used to enable a user to establish a new user account, an application server that enables a user to access one or more functions, applications or services, or another type of system or component of a host system (such as an Internet access or service provider). The application system 325 and the authentication system 220 may be included in a host system, such as an Internet access or service provider system.

The process 300 begins when the client system 210 sends a request to establish a first communication session with the authentication system 220 (step 330C). The request may be initiated, for example, when a user uses the client system 210 to sign onto a host system supported by the authentication system 220. The process 300 also may begin, for example, when a user uses the client system 210 to request a new account or otherwise register with the authentication system 220 or with a host system associated with the authentication system 220.

The authentication system 220 receives the request to establish a first communication session (step 330A). The authentication system 220 and the client system 210 exchange messages to establish the first communication session (step 332A). The first communication session may be established using a secure connection or a secure communication session, though that need not necessarily be so. In one example, a secure connection may be established using the SSL protocol to establish a secure connection between the authentication system 220 and the client system 210.

The authentication system 220 generates linked authentication credentials (step 334A). A first authentication credential may be linked to a second authentication credential, for example, by including in the first authentication credential a reference to the second authentication credential. More particularly, a first authentication credential may include the identifier that is used to uniquely identify the second authentication credential. In some implementations, each of the linked authentication credentials may include identifiers of the other authentication credential to establish a two-way link between the two authentication credentials. A link between two authentication credentials may be based on an association that occurs outside of the authentication credentials themselves. For example, an association of the authentication credentials may be stored in a database or another type of data collection to establish a linkage between the authentication credentials.

The authentication system 220 uses the first communication session to send one of the authentication credentials to the client system 210 (step 336A). The seat authentication credential may be referred to as a first authentication credential.

The client system 210 receives the first authentication credential (step 336C) and ends the first communication session with the authentication system 220 (step 338C). In some implementations, the client system 210 need not necessarily explicitly terminate or otherwise end the first communication session. The first communication session may end based on a passage of a predetermined amount of time in which no communication activity occurs in the first communication session (e.g., a timeout) or based on another method of automatically terminating the first communication session by the client system 210 or the authentication system 220.

Referring also to FIG. 3B, the client system 210 sends to the application system 325 a request to establish a second communication session (step 340C). After the application system 325 receives the request to establish the second communication session (step 340AS), the application system 325 and the client system 210 exchange messages to establish the second communication session (step 342AS). The application system 325 sends to the authentication system 220 a request for the other of the linked authentication credentials (step 344AS). After the authentication system 220 receives the request (step 344A), the authentication system 220 sends the other of the linked authentication credentials to the application system 325 (step 345A), which, in turn, receives the other of the linked authentication credentials (step 345AS).

The application system 325 sends to the client system 210 the other of the linked authentication credentials using the second communication session (step 346AS). The sent authentication credential may be referred to as the second authentication credential. The client system 210 receives, over the second communication session, the second authentication credential (step 346C). The second communication session ends (step 348C), either automatically or through an explicit instruction by the client system 210 or the application system 325.

In some implementations, the authentication system 220 may generate the second authentication credential based on the receipt of a request to establish for the second authentication credential from the application system 325. Such generation is an alternative to generating both linked authentications credentials during the first communications session.

Referring also to FIG. 3C, the client system 210 sends to the authentication system 220 a request to establish a secure communication session (step 350C). The authentication system 220 receives the request from the client system 210 (step 350A). The authentication system 220 and the client system 210 exchange messages to establish a secure communication session (step 352A). This session may be established, for example, using the SSL protocol. The established communication session may be referred to as a third communication session or a secured communication session.

The client system 210 sends the first and second authentication credentials to the authentication system 220 using the secured communication session (step 354C).

The authentication system 220 receives, over the secured communication session, the first and second authentication credentials (step 354A), and determines whether the first and second authentication credentials are linked (step 356A). This may be accomplished, for example, by determining whether the second authentication credential includes a reference to the identifier or other information that is uniquely associated with the first authentication credential. In another example, unique identifiers associated with each of the authentication credentials may be looked up in a data collection that associates authentication credentials to determine whether the received authentication credentials are linked.

The authentication system 220 enables the use of the second authentication credential based on a determination that the first authentication credential and the second authentication credentials are linked (step 358A). This may be accomplished, for example, by modifying the second authentication credential. In one example, a flag or another type of indicator in the second authentication credential may be set to indicate that the second authentication credential is able to be used to authenticate the client system 210. In another example, an identifier of the second authentication credential may be added to a list of enabled, valid, active or otherwise usable authentication credentials. In other words, the second authentication credential, once identified as enabled, is able to be used without also presenting the first authentication credential to authenticate the client system 210.

In some implementations, the second authentication credential may enable access to additional functions or services to which the first authentication credential does not enable access. For example, a first authentication credential may enable access only to a registration function, whereas an enabled second authentication credential may permit a user to access multiple functions, applications or services in lieu of, or in addition to, a registration function.

The authentication system 220 uses the secured communication session to send the enabled second authentication credential to the client system 210 (step 360A). The client system 210 receives the enabled second authentication credential using the secured communication session (step 360C), and the process 300 ends. In some implementations, the authentication system, in lieu of sending back a second authentication credential that is enabled, may send a third authentication credential to the client system that may be used to access functions and services.

In some implementations, both the first and third communication sessions may be secured communication sessions. Alternatively or additionally, the second communication session may also be a secured communication session.

These techniques may be used to help ensure that the usable authentication credential (here, the enabled second authentication credential) is provided only the client system 210.

Figure 4:
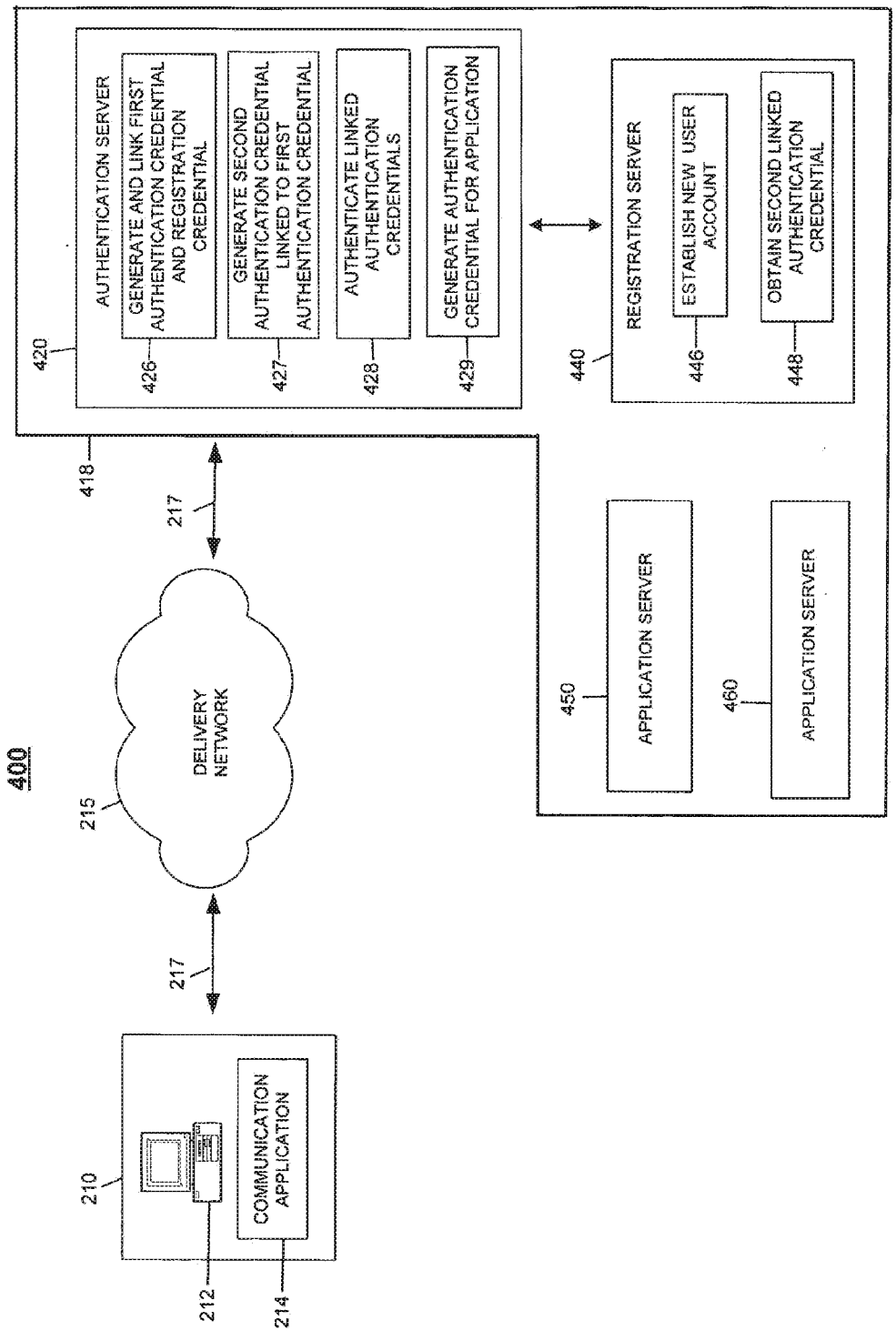

FIG. 4 illustrates another example of a communications system 400 that is capable of providing an authentication credential for use in authenticating a client where the authentication credential is enabled based on presentation of multiple linked authentication credentials. For convenience, the communications system 400 shown in FIG. 4 references particular componentry described with respect to FIG. 2. However, similar methodologies may be applied to other implementations where different components are used to define the structure of the system, or where the functionality is distributed differently among the components shown by FIG. 2.

The communication system 400 includes a client system 210 and a host system 418 having an authentication server 420, a registration server 440, and application servers 450 and 460. The client system 210 and the host system 418 are able to communicate using the delivery network 215 having communication pathways 217.

The host system 418 may be operated by an Internet access or servile provider. In another example, the host system 418 may be operated by another type of business enterprise that provides multiple secured applications to employees, suppliers and/or customers. The host system 418 may be an implementation of the authentication system 220 of FIG. 2.

The authentication server 420 may be a general-purpose or a special-purpose computer. The authentication server 420 includes code segments 426 configured to, when executed, generate and link a first authentication credential and a registration credential. To link the first authentication credential and the registration credential, the authentication server 420 includes the identifier of the first authentication credential in the registration credential.

The authentication server 420 also includes code segments 427 configured to, when executed, generate a second authentication credential that is linked to the first authentication credential. To do so, the authentication server 420 includes the identifier of the first authentication credential in the second authentication credential. When generated, the second authentication credential is not able to be used for authentication. For example, a status flag may be set to "invalid," "inactive," or otherwise unusable.

The authentication server 420 also includes code segments 428 configured to, when executed, authenticate linked authentication credentials. To do so, the authentication server 420 determines whether authentication credentials that are presented together in a communication session are linked. In other words, the authentication server 420 determines whether one of the received authentication credentials includes the identifier of the other received authentication credential and, if so, determines that the authentication credentials are linked and, therefore, that the authentication credentials are valid.

The authentication server 420 also includes code segments 429 configured to, when executed, generate an application credential for presentation to an application that operates on application server 450 or application server 460.

The registration server 440 may be a general-purpose or a special-purpose computer. The registration server 440 includes code segments 446 configured to, when executed, enable a user of the client system 210 to establish a new user account. The registration server 440 is configured to receive input from a user of the client system 210 and/or to display a user interface to gather input related to a user account. Such information may include, for example, a user name, address, payment and/or billing information. The registration server 440 also includes code segments 448 configured to, when executed, obtain a second authentication credential from the authentication server 420.

The communication system 400 illustrates how a host system 418 may be used to provide an authentication credential for use in authenticating a client system 210 where the authentication credential is enabled based on presentation of multiple linked authentication credentials. The client system 210 exchanges communications with the authentication server 420 to obtain a first authentication credential and a registration credential for use in establishing a new account on the registration server 440. More particularly, a user of the client system 210 may initiate a request to establish (or otherwise register) a new account with the host system 418.

In response to the received request, the authentication server 420 executes code segments 426 to generate and link a first authentication credential and a registration credential such that the registration credential includes the identifier of the first authentication credential. The authentication server 420 sends to the client system 210 the first authentication credential and the registration credential.

Subsequently, the client system 210 sends the registration credential to the registration server 440, which, in turn, receives the registration credential. The registration server 440 executes code segments 446 and, through an exchange of messages with the client system 210, establishes a new account for a user of the client system 210 based on the presentation of the registration credential.

The registration server 440 also executes code segments 449 to obtain, from the authentication server 420, a second authentication credential that is linked to the first authentication credential. More particularly, the registration server 440 provides the registration credential to the authentication server 420. In response to receiving the registration credential, the authentication server 420 executes code segments 427 to generate a second authentication credential that is linked to the first authentication credential. To do so, the authentication server 420 generates an authentication credential that includes the identifier of the first authentication credential. The authentication server 420 is able to do so because the registration credential includes the identifier of the first authentication credential. The second authentication credential generated by the authentication server 420, however, initially may not able to be used by itself to authenticate the client system 210. For example, the authentication server 420 may mark, or otherwise designate, the second authentication credential as "invalid," "inactive" or otherwise unusable. The authentication server 420 sends the unusable second authentication credential to the registration server 440, which, in turn, forwards the unusable second authentication credential to the client system 210. Because the second authentication credential is marked as unusable, the second authentication credential may not be used if misappropriated during transmission to the client system 20.

The client system 210 establishes a secure communication session with the authentication server 420 and uses the secure communication session to send to the authentication server 420 the first and the second authentication credentials that previously were provided to the client system 210 in separate communication sessions.

The authentication server 420 receives the first and second authentication credentials and executes code segments 428 to determine whether the first and second authentication credentials are linked. To do so, the authentication server 420 determines whether the second authentication credential that is marked as unusable includes the identifier of the first authentication credential. When the authentication server 420 determines that the second authentication credential is linked to the first authentication credential, the authentication server 420 marks the second authentication credential as "valid," "active," or otherwise as usable. The authentication server 420 then provides to the client system 210, over the secure communication session, the second authentication credential that is now enabled to authenticate the client system 210.

The client system 210 presents the enabled second authentication credential to the authentication server 420 to obtain an application credential to access a secured application or website operating on the application server 450 without being challenged by the secured application or website. The authentication server 420 receives the enabled second authentication credential, authenticates the second authentication credential, and executes code segments 429 to generate an authentication credential for a secured application, which is provided to the client system 210. The client system 210 sends the authentication credential for a secured application to the application server 450 which grants access to the client system 210 without challenging the client system 210 (such as by requesting the entry of a valid combination of a user name and a password).

Subsequently, when a user of the client system 210 seeks access to a second secured application, the client system 210 presents for a second time the enabled second authentication credential to the authentication server 420 to obtain an application credential to access a secured application or website operating on the application server 460 without being challenged by the secured application or website. The authentication server 420 receives the enabled second authentication credential, authenticates the second authentication credential, and executes code segments 429 to generate a second authentication credential for a secured application, which is provided to the client system 210. The client system 210 sends the second authentication credential for a secured application to the application server 460 which grants access to the client system 210 without challenging the client system 210 (such as by requesting the entry of a valid combination of a user name and a password).

FIG. 5A shows an example data structure 500A, in simplified form, for an authentication credential that may be linked to another authentication credential. In the example 500A, the authentication credential may be a time-limited cryptographic message for use in the Kerberos authentication system and may be referred to as a ticket. A ticket may be a ticket-granting ticket that an authenticated identity receives from an authentication service for later presentation back to the authentication service to receive a service ticket. A ticket also may be a service ticket that is received by the authentication service and may be presented to a service or application to transparently gain access to a secure service or application—that is, the identity is able to gain access to the secure service or application without being required to respond to challenge, such as entering a valid combination of a user name and a password.

The ticket data structure 500A includes a ticket identifier 511A that uniquely identifies a ticket. The ticket data structure 500A also includes session key 512A that is used to encrypt data sent in a communication session for which the ticket is valid. The ticket data structure 500 also includes a parent ticket identifier 513A. When ticket is a first ticket granting ticket generated during a communication session, the parent ticket identifier may be null, blank or otherwise indicate that the ticket is not linked to another ticket. When the generated ticket is a second ticket-granting ticket or a registration ticket, the parent ticket identifier 513A reflects the ticket identifier 511A of the first ticket-granting, ticket so as to link the first ticket-granting ticket with the second ticket-granting ticket or the registration ticket.

The ticket data structure 500A also includes a validity period 514A that indicates a time period during which the ticket may be used. In many cases, the validity period represents a period between eight and twenty-four hours from the time that the ticket was generated or enabled for use. The validity period 514A may be denoted using one or more of a start time/date, an expiration time/date and a time-to-live period that indicates a length of time.

The ticket data structure 500A also includes indicators 515A that identify the functions for which the ticket may be used. As such, the indicators 515A may be used to distinguish a ticket-granting ticket from a service ticket. Examples of functions include registration functions, access to a particular secure application, or a function within a particular secure application.

The ticket data structure 500A also includes a user name and authorization data 516A for the user identity associated with the ticket. Each entry in a ticket data structure 510A also includes an indicator 517A that indicates one or more IP ("Internet Protocol") addresses from with the ticket may be sent.

The ticket data structure 500A also includes an indication 518A as to whether the ticket is usable as a ticket-granting ticket.

FIG. 5B illustrates example authentication credentials 500B that include a portion of the data structure 500A of FIG. 5A. The shown data structure of the examples 500B includes ticket identifiers 511B, parent ticket identifiers 513B, validity periods in the form of expiration dates and times 514B, and indications 515B of functions allowed.

The examples 500B include a first ticket-granting ticket 521, a registration ticket 522, a second ticket-granting ticket 523, and a service ticket 524. As illustrated, the registration ticket 522 includes a parent ticket identifier 513B that reflect the ticket identifier 511B of the first ticket-granting ticket 521. Similarly, the second ticket-granting ticket 523 also includes a parent ticket identifier 513B reflecting the ticket identifier 511B of the first ticket-granting ticket 521. As such, each of the registration ticket 523 and the second ticket-granting ticket 523 is linked, through the parent ticket identifier 513B, to the first ticket-granting ticket 521.

As shown, the service ticket 524 includes a parent ticket identifier 513B that includes the ticket identifier 511A of the second ticket-granting ticket 523. The service ticket 524 indicates the ticket-granting ticket (here, the second ticket-granting ticket 523) used to obtain the service ticket 524. The service ticket need not necessarily be linked to a ticket-granting ticket.

FIG. 6A-6D show an exemplary process 600 involving a client system 210 and a host system having an authentication server 420, a registration server 430 and art application server 450. The process 600 provides an authentication credential to the client system 210 and permits the client system 210 to access a secured application on the application server 450. For convenience, the process 600 shown in FIG. 6A-6D references particular componentry described with respect to FIG. 4. However, similar methodologies may be applied in other implementations where different componentry is used to define the structure of the system or where the functionality is distributed differently among the components shown in FIG. 4.

Referring to FIG. 6A, the process 600 begins when the client system 210 attempts to establish a communication system with the authentication server 420 (step 612C). The client system 210 does so by sending a request to establish a new account to the authentication server 420 (step 614C), which is received by the authentication server 420 (step 614A).

The authentication server 420 generates a first ticket-granting ticket and a registration ticket that is linked to the first ticket-granting ticket (step 616A). This may be done, for example, by including the ticket identifier of the first ticket-granting ticket in the parent ticket identifier of the registration ticket, as described previously with respect to FIGS. 4 and 5B. The authentication server 410 sends the registration ticket to the client system 210 (step 618A).

The client system 220 receives the registration ticket (step 618C), and establishes a communication session with the registration server (step 620C). The communication session established with the registration server 430 may be a secured communication session that is established through, for example, the use of the SSL protocol. The client system 210 sends to the registration server 430 the registration ticket and registration information to establish a new account (step 622C). Such registration information may include, for example, the user's first and last name, billing address, and payment information, such as a credit card number and a credit card expiration date.

The registration server 430 receives the registration ticket and registration information (step 622R) and establishes a new account with the registration information based on the presentation of the registration ticket by the client system 210 (step 624R). The registration server 430 sends the registration ticket to the authentication server (step 626R), which, in turn, receives the registration ticket (step 626A).

Figure 6B:
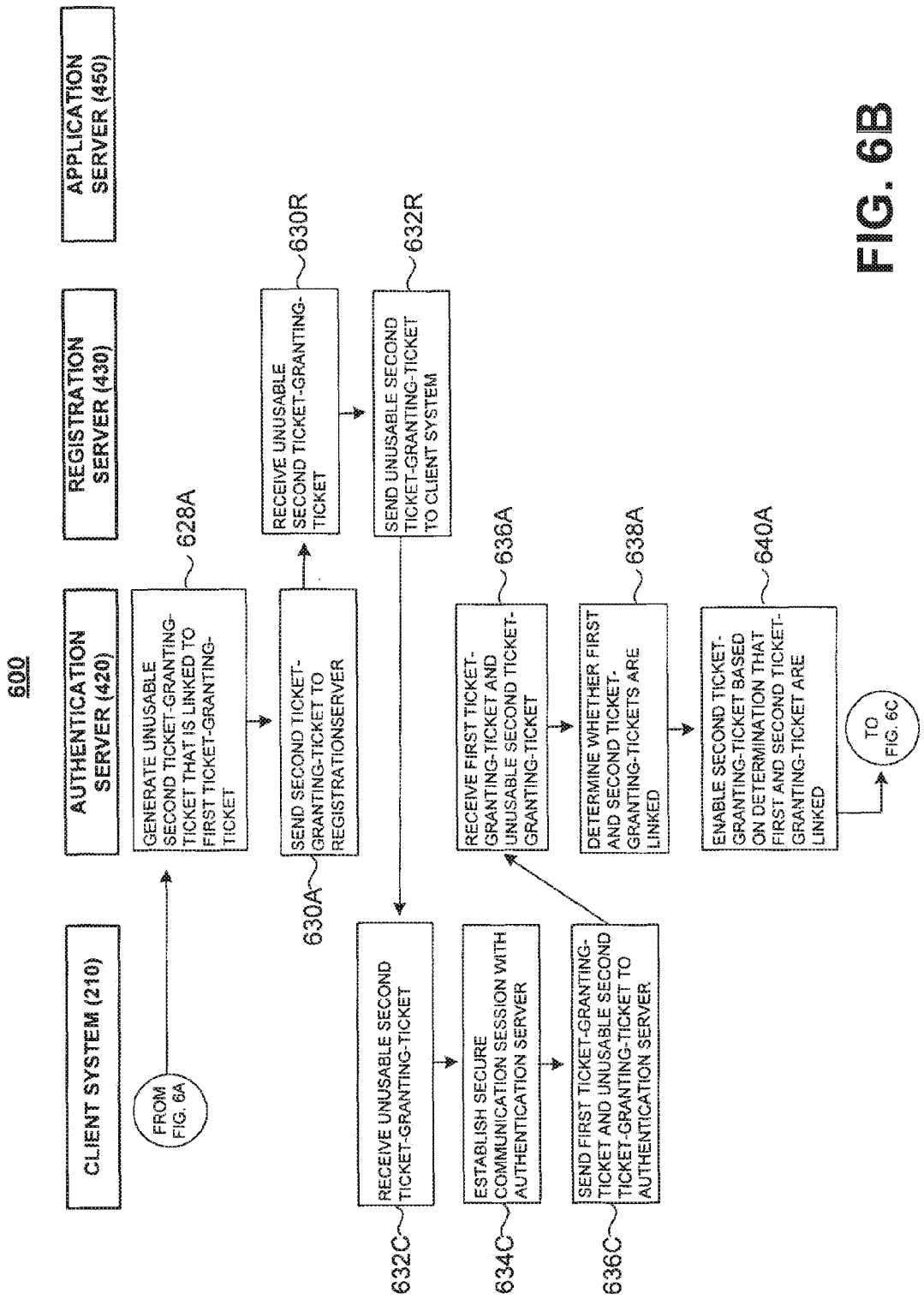

Referring also to FIG. 6B, the authentication server 420 generates a unusable second ticket-granting ticket that is linked to the first ticket-granting ticket (step 628A). This may be accomplished, for example, by using the parent ticket identifier of the registration ticket as the parent ticket identifier of the second ticket-granting ticket. The second ticket-granting ticket is not yet able to authenticate an identity that presents the second ticket-granting ticket without the presence of the first ticket-granting ticket. The second ticket-granting ticket may be made unusable, for example, by having a status flag set, for example, to unusable, invalid or inactive. One example of such a status flag is the usable indicator 518A of the ticket data structure 500A of FIG. 5A.

The authentication server 420 sends the unusable second ticket-granting ticket to the registration server (step 630A). The registration server 430 receives the unusable second ticket-granting ticket (step 630R) and sends to client system 210 the unusable second ticket-granting ticket (step 632R).

The client system 210 receives the unusable second ticket-granting ticket (step 632C) and establishes a secure communication session with the authentication server 420 (step 634C). The client system 210 sends the first ticket-granting ticket and the unusable second ticket-granting ticket to the authentication server 420 using the secure communication session (step 636C).

The authentication server 420 receives the first ticket-granting ticket and unusable second ticket-granting ticket (step 636A) and determines whether the first and second ticket-granting tickets are linked (step 638A). To do so, for example, the authentication server 420 determines whether the parent ticket identifier of the second ticket-granting ticket refers to the unique identifier of the first ticket-granting ticket.

When the authentication server 420 determines that the first and second ticket-granting tickets are linked (step 638A), the authentication server 420 enables, based on that determination, the use of the second ticket-granting ticket to authenticate the client system 210 without the concurrent presentation of the first ticket-granting ticket (step 640A). For example, the authentication server 420 may set a flag, such as the usable indicator 518A of the ticket data structure 500A of FIG. 5A, to indicate that the second ticket-granting ticket is active, valid or otherwise usable as a ticket-granting ticket to prove the identity of the client system 210. Once enabled for use as an authentication credential without the concurrent presentation of the first ticket-granting ticket, the second ticket-granting ticket may be referred to as a usable second ticket-granting ticket or an enabled ticket-granting ticket.

In this or other implementations, the authentication server 420 may enable the second ticket-granting ticket for use in authentication for a predetermined amount of time. This may be accomplished, for example, by setting a validity period, such as the validity period 514A of FIG. 5, of the second ticket-granting ticket for a predetermined amount of time based on the time that the second ticket-granting ticket is enabled for use. Alternatively or additionally, the authentication server 420 may enable the second ticket-granting ticket for use in authentication for only a single communication session.

Referring also to FIG. 6C, the authentication server 420 sends to the client system, over the secured communication session, the enabled second ticket-granting ticket (step 642A).

The client system 210 receives, over the secured communication session, the enabled second ticket-granting ticket (step 642C). Subsequently, the client system 210 presents to the authentication server the enabled second ticket-granting ticket with a request to access a particular secured application (step 644C).

The authentication server 420 receives the enabled second ticket-granting ticket with a request to access the particular secured application (step 644A) and determines whether the enabled second ticket-granting ticket is authentic (step 646A). To do so, the authentication server may determine that the second ticket-granting ticket is enabled in that the field in the second ticket-granting ticket is set to indicate that the ticket is valid or otherwise activated or enabled. The authentication server 420 also may employ cryptographic techniques to determine whether the second ticket-granting ticket is authentic. For example, the authentication server 420 may be able to decrypt an encrypted second ticket-granting ticket, which may help to establish the authenticity of the second ticket-granting ticket.

The authentication server 420 generates a service ticket to access a particular secured application based on the authenticated second ticket-granting ticket (step 648A). The service ticket may be encrypted with a key known to the secured application. The service ticket also may include a session key that may be used by the client system to access the secured application. The authentication server 420 sends to the client system 210 the service ticket to access the particular secured application (step 650A).

Figure 6D:
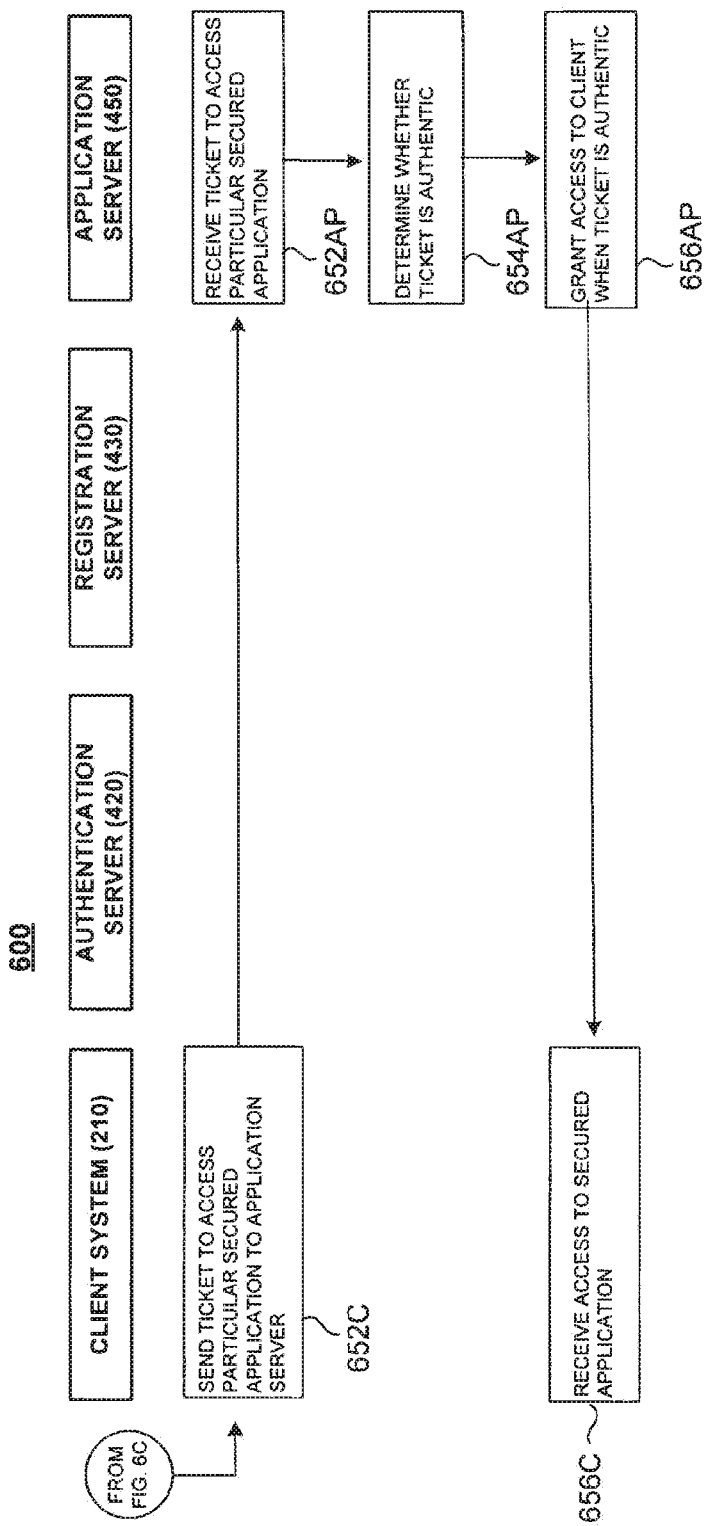

The client system 210 receives the service ticket to access the particular secured application (step 650C). Referring also to FIG. 6D, the client system 210 sends the service ticket to the application server 450 (step 652C).

The application server 540 receives the service ticket to access a particular secured application (step 652AP) and determines whether the service ticket is authentic (step 654AP). To do so, for example, the application server 450 may apply a long-term service key to decrypt the ticket, where the long-term service key is known only by the application server 450 and the authentication server 420. Once the ticket is decrypted, the application server 450 may use the session key in the ticket to further decrypt messages exchanged with the client system 210 during the communication session.

The application server 450 may grant access to the client when the service ticket is deemed to be authentic (step 656AP). The application server 450 grants access without requiring the client system or user of the client system to respond to a challenge, such as entering a valid combination of user name and password (step 656AP). Finally, the client system 210 receives access to the secured application (step 656C).

The process 600 provides a secured manner to provide a ticket-granting ticket to the client system 210 that helps to prevents or minimizes the likelihood that the usable ticket-granting ticket will be intercepted during transmission and used to gain access inappropriately to a secured application. This is accomplished, in general, by providing two tickets to the client system in separate communication sessions and requiring the client system to present both tickets to the authentication server to received a usable second ticket-granting ticket, which is able to be used to gain access to one or more secured application on the application 450.

Figure 7:
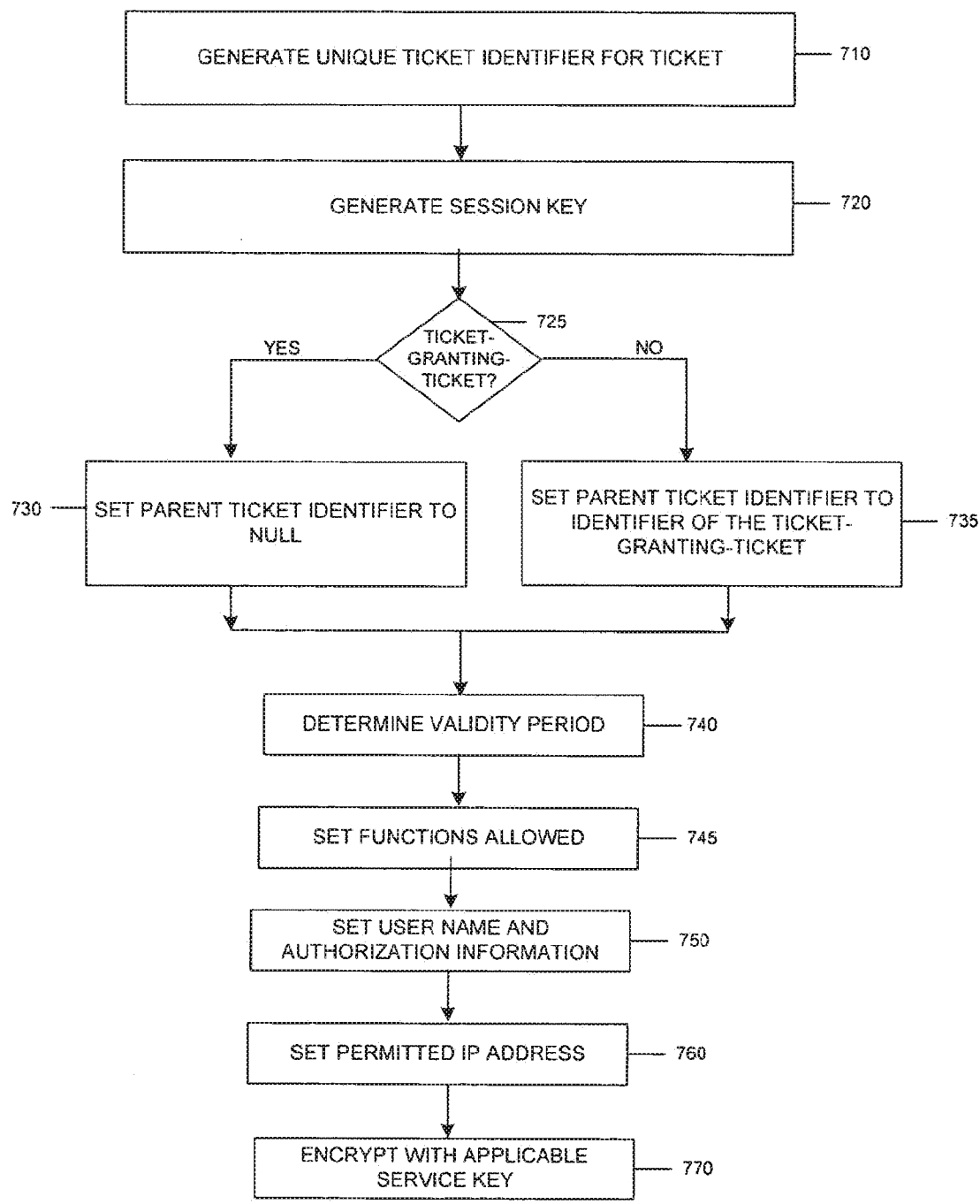
FIG. 7 is a flow chart of a process for generating an authentication credential.

FIG. 7 illustrates a process 700 for generating a ticket. The process 700 may be performed by a processor or processors on a host or authentication system that provides access to one or more secured applications. Examples include the authentication system 210 of FIG. 2, die host system 418 of FIG. 4, the authentication server 420 of FIG. 4, or another component of a host or authentication system that provides access to one or more secured applications. The ticket-generation process 700 also may be referred to as a ticket granting process 700.

The process 700 begins with the receipt of a request to generate a particular ticket and an indication as to whether the ticket to be generated is a ticket-granting ticket that may be used to obtain service tickets or the ticket to be generated is a service ticket that may be used to access a secured application.

The processor generates a unique ticket identifier for the ticket (step 710). To do so, the processor may use a proprietary process to generate a proprietary identifier or may use a well-known process that is publicly available, such as a process to generate a globally unique identifier (GUID).

The processor also generates a session key for the ticket (step 720). The session key is a shared secret that may be used between ticket recipients (such as the client system, the registration server, or the application server) to validate a ticket presented.

The processor determines whether the ticket to be generated is a ticket-granting ticket (step 725). This may be accomplished, for example, based on a parameter that is defined when the process 700 is initiated. When the ticket to be generated is a ticket-granting ticket (step 720), the processor sets the parent ticket identifier to null, blank or any type of indicator to show that there is not a parent ticket identifier associated with the ticket (step 730). When the ticket to be generated is not a ticket-granting ticket (e.g., a service ticket is to be generated) (step 725), the processor sets the parent ticket identifier of the ticket to the identifier of the ticket-granting ticket provided to the process 700 (step 735).

The processor determines a validity period for the ticket (step 740). This may be accomplished, for example, by determining a time to live ("TTL") of the ticket. The time to live of a ticket is the minimum of a requested time to live that may be included in the ticket request, a service-specific maximum time-to-live, a global maximum time-to-live, and a remaining lifetime of the ticket-granting ticket, all of which may be based on the date and time that the ticket is generated.

The processor sets the allowed functions for the ticket (step 745). The allowed functions list may be set for a special function ticket, such as a registration ticket. The function may include, for example, registration, resetting the password and other account management features.

The processor sets the user name and authentication information of the ticket (step 750). For example, the processor may retrieve user authentication data, if applicable, for the ticket being generated. This may be useful for a service ticket to provide user and authentication information to a secure application.

The processor sets the permitted IP address from which the ticket may be used (step 760). The permitted IP address may be based on the IP address from which the request to obtain a ticket was sent.

The processor encrypts the generated ticket with an applicable service key (step 770). Encrypting the ticket with an applicable service key makes the ticket readable only by the service provider that possesses the service key. For example, if the ticket is a ticket-granting ticket, the ticket generated in process 700 is encrypted using a key associated with the authentication server or the ticket-granting process. In another example, when the ticket is a service ticket for a registration process, the ticket is encrypted using the key of the registration service. This may help to ensure that only the registration service is able to decrypt and read the ticket. In yet another example, when the ticket is a service ticket for a particular secured application, the ticket is encrypted using the key of the particular secured application, which may help ensure that only the particular secured application is able to decrypt and read the ticket.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. As another example, a screen name is used throughout to represent a unique identifier of an account, but any other unique identifier of an account may be used when linking accounts. Accordingly, other implementations are within the scope of the following claims.

What is claimed is:

1. A method of facilitating authenticating of a client device, the method comprising:
   providing, to a client device in a first communication session, a first authentication credential;
   providing, to the client device in a second communication session that is different from the first communication session, a second authentication credential, the second authentication credential being linked to the first authentication credential, wherein the second authentication credential includes a status indicator that indicates that the second authentication credential is inactive, and wherein the second authentication credential, including the status indicator that indicates that the second authentication credential is inactive, by itself, fails to authenticate the client device;
   receiving the first authentication credential and the second authentication credential from the client device in a third communication session that is different from the second communication session;
   determining that the first authentication credential and the second authentication credential are linked; and
   based on the determination that the first authentication credential and the second authentication credential are linked, enabling the second authentication credential to be used as a mechanism in authenticating the client device, wherein enabling the second authentication credential comprises setting the status indicator to indicate that the second authentication credential is active, wherein the second authentication credential, once identified as enabled by setting the status indicator to indicate that the second authentication credential is active, authenticates the client device without also presenting the first authentication credential.

2. The method of claim 1 wherein:
   providing a first authentication credential to the client device comprises providing, to the client device, a first authentication credential that includes an identifier that uniquely identifies the first authentication credential;
   providing a second authentication credential that is linked to the first authentication credential to the client device comprises providing, to the client device, a second authentication credential that includes a parent authentication credential identifier that indicates that the second authentication credential is linked to the first authentication credential by referencing the identifier that uniquely identifies the first authentication credential; and
   determining that the first authentication credential and the second authentication credential are linked comprises determining that the second authentication credential includes the parent authentication credential identifier that references the identifier that uniquely identifies the first authentication credential.

3. The method of claim 2 wherein providing, to the client device, a second authentication credential that includes a parent authentication credential identifier that references the identifier that uniquely identifies the first authentication credential comprises providing, to the client device, a second authentication credential identifier that includes a parent authentication credential identifier that includes the identifier that uniquely identifies the first authentication credential.

4. The method of claim 1 wherein:
- providing a second authentication credential that is linked to the first authentication credential to the client device comprises providing, to the client device, a second authentication credential that includes an identifier that uniquely identifies the second authentication credential;
- providing a first authentication credential to the client device comprises providing, to the client device, a first authentication credential that includes a parent authentication credential identifier that indicates that the second authentication credential is linked to the first authentication credential by referencing the identifier that uniquely identifies the second authentication credential; and
- determining that the first authentication credential and the second authentication credential are linked comprises determining that the first authentication credential includes the parent authentication credential identifier that references the identifier that uniquely identifies the second authentication credential.

5. The method of claim 1 further comprising providing, over the third communication session, the second authentication credential that is enabled for use in authenticating the client device.

6. The method of claim 1 wherein:
- the first communication session comprises a secure communication session, and
- the third communication session comprises a secure communication session.

7. The method of claim 5 wherein the second communication session comprises a communication session that differs in security from the first and third communication sessions.

8. The method of claim 1 wherein enabling the second authentication credential for use in authentication of the client device comprises enabling the second authentication credential for use in authentication of the client device for a predetermined amount of time.

9. The method of claim 1 wherein the first authentication credential comprises a ticket-granting ticket able to be used in only a single communication session.

10. The method of claim 1 wherein the second authentication credential comprises a ticket-granting ticket able to be used in only a single communication session.

11. An apparatus for facilitating authenticating of a client device, the apparatus comprising:
- at least one processor; and
- memory storing instructions that, when executed by the at least one processor, cause the apparatus to perform:
  - providing, to a client device in a first communication session, a first authentication credential;
  - providing, to the client device in a second communication session that is different from the first communication session, a second authentication credential, the second authentication credential being linked to the first authentication credential, wherein the second authentication credential includes a status indicator that indicates that the second authentication credential is inactive, and wherein the second authentication credential, including the status indicator that indicates that the second authentication credential is inactive, by itself, fails to authenticate the client device;
  - receiving the first authentication credential and the second authentication credential from the client device in a third communication session that is different from the second communication session;
  - determining that the first authentication credential and the second authentication credential are linked; and
  - based on the determination that the first authentication credential and the second authentication credential are linked, enabling the second authentication credential to be used as a mechanism in authenticating the client device, wherein enabling the second authentication credential comprises setting the status indicator to indicate that the second authentication credential is active, wherein the second authentication credential, once identified as enabled by setting the status indicator to indicate that the second authentication credential is active, authenticates the client device without also presenting the first authentication credential.

12. The apparatus of claim 11 wherein:
- providing a first authentication credential to the client device comprises providing, to the client device, a first authentication credential that includes an identifier that uniquely identifies the first authentication credential;
- providing a second authentication credential that is linked to the first authentication credential to the client device comprises providing, to the client device, a second authentication credential that includes a parent authentication credential identifier that indicates that the second authentication credential is linked to the first authentication credential by referencing the identifier that uniquely identifies the first authentication credential; and
- determining that the first authentication credential and the second authentication credential are linked comprises determining that the second authentication credential includes the parent authentication credential identifier that references the identifier that uniquely identifies the first authentication credential.

13. The apparatus of claim 12 wherein providing, to the client device, a second authentication credential that includes a parent authentication credential identifier that references the identifier that uniquely identifies the first authentication credential comprises providing, to the client device, a second authentication credential identifier that includes a parent authentication credential identifier that includes the identifier that uniquely identifies the first authentication credential.

14. The apparatus of claim 11 wherein:
- providing a second authentication credential that is linked to the first authentication credential to the client device comprises providing, to the client device, a second authentication credential that includes an identifier that uniquely identifies the second authentication credential;
- providing a first authentication credential to the client device comprises providing, to the client device, a first authentication credential that includes a parent authentication credential identifier that indicates that the second authentication credential is linked to the first authentication credential by referencing the identifier that uniquely identifies the second authentication credential; and
- determining that the first authentication credential and the second authentication credential are linked comprises determining that the first authentication credential includes the parent authentication credential identifier that references the identifier that uniquely identifies the second authentication credential.

15. The apparatus of claim 11 wherein at least one of the first authentication credential and the second authentication credential comprises a ticket-granting ticket able to be used in only a single communication session.

16. At least one non-transitory computer-readable medium storing computer-executable instructions that when executed by at least one processor cause the at least one processor to perform:
- providing, to a client device in a first communication session, a first authentication credential;
- providing, to the client device in a second communication session that is different from the first communication session, a second authentication credential, the second authentication credential being linked to the first authentication credential, wherein the second authentication credential includes a status indicator that indicates that the second authentication credential is inactive, and wherein the second authentication credential, including the status indicator that indicates that the second authentication credential is inactive, by itself, fails to authenticate the client device;
- receiving the first authentication credential and the second authentication credential from the client device in a third communication session that is different from the second communication session;
- determining that the first authentication credential and the second authentication credential are linked; and
- based on the determination that the first authentication credential and the second authentication credential are linked, enabling the second authentication credential to be used as a mechanism in authenticating the client device, wherein enabling the second authentication credential comprises setting the status indicator to indicate that the second authentication credential is active, wherein the second authentication credential, once identified as enabled by setting the status indicator to indicate that the second authentication credential is active, authenticates the client device without also presenting the first authentication credential.

17. The at least one non-transitory computer-readable medium of claim 16 wherein:
- providing a first authentication credential to the client device comprises providing, to the client device, a first authentication credential that includes an identifier that uniquely identifies the first authentication credential;
- providing a second authentication credential that is linked to the first authentication credential to the client device comprises providing, to the client device, a second authentication credential that includes a parent authentication credential identifier that indicates that the second authentication credential is linked to the first authentication credential by referencing the identifier that uniquely identifies the first authentication credential; and
- determining that the first authentication credential and the second authentication credential are linked comprises determining that the second authentication credential includes the parent authentication credential identifier that references the identifier that uniquely identifies the first authentication credential.

18. The at least one non-transitory computer-readable medium of claim 17 wherein providing, to the client device, a second authentication credential that includes a parent authentication credential identifier that references the identifier that uniquely identifies the first authentication credential comprises providing, to the client device, a second authentication credential identifier that includes a parent authentication credential identifier that includes the identifier that uniquely identifies the first authentication credential.

19. The at least one non-transitory computer-readable medium of claim 16 wherein:
- providing a second authentication credential that is linked to the first authentication credential to the client device comprises providing, to the client device, a second authentication credential that includes an identifier that uniquely identifies the second authentication credential;
- providing a first authentication credential to the client device comprises providing, to the client device, a first authentication credential that includes a parent authentication credential identifier that indicates that the second authentication credential is linked to the first authentication credential by referencing the identifier that uniquely identifies the second authentication credential; and
- determining that the first authentication credential and the second authentication credential are linked comprises determining that the first authentication credential includes the parent authentication credential identifier that references the identifier that uniquely identifies the second authentication credential.

20. The at least one non-transitory computer-readable medium of claim 16 wherein at least one of the first authentication credential and the second authentication credential comprises a ticket-granting ticket able to be used in only a single communication session.

* * * * *